(12) United States Patent
Kohda

(10) Patent No.: US 7,131,458 B2
(45) Date of Patent: Nov. 7, 2006

(54) PIPE COUPLING INCLUDING FIRST AND SECOND COUPLING MEMBERS

(75) Inventor: Toru Kohda, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 5 days.

(21) Appl. No.: 10/971,368

(22) Filed: Oct. 22, 2004

(65) Prior Publication Data

US 2005/0087239 A1   Apr. 28, 2005

(30) Foreign Application Priority Data

Oct. 22, 2003 (JP) ............... 2003-361381

(51) Int. Cl.
*F16L 37/28* (2006.01)
(52) U.S. Cl. .............. 137/614.03; 137/614.05
(58) Field of Classification Search ........... 137/614.03, 137/614.04, 614.05; 251/149.2
See application file for complete search history.

(56) References Cited

U.S. PATENT DOCUMENTS 3,279,497 A * 10/1966 Norton et al. ......... 137/614.03

| 4,473,211 A | 9/1984 | Fremy |
|---|---|---|
| 2005/0087240 A1 | 4/2005 | Kohda |
| 2005/0087241 A1 | 4/2005 | Kohda |

FOREIGN PATENT DOCUMENTS

| JP | S58-160692 A | 9/1983 |
|---|---|---|
| JP | 2004-211739 A | 7/2004 |

* cited by examiner

*Primary Examiner*—Kevin Lee
(74) *Attorney, Agent, or Firm*—Brinks Hofer Gilson & Lione

(57) ABSTRACT

A pipe coupling is configured such that when a male coupling member and a female coupling member are to be connected with each other, a valve disposed in the female coupling member is partly inserted into the male coupling member so as to come into press-contact with the valve in the male coupling member, and to cause displacement of the valves, to thereby open a fluid passage in the pipe coupling. An O-ring is provided on the interior surface of the male coupling member. A sleeve is arranged in a female coupling member such that a forward end portion of the sleeve is inserted into the male coupling member in such a manner that the outer surface of the forward end portion of the sleeve sealingly engages with the O-ring, while allowing the valves of the male and female coupling members abut against each other within the forward end portion of the sleeve.

5 Claims, 5 Drawing Sheets

US 7,131,458 B2

PIPE COUPLING INCLUDING FIRST AND SECOND COUPLING MEMBERS

This application claims priority under 35 U.S.C. § 119 to Japanese Patent Application No. 2003-361381 filed Oct. 22, 2003, the entire content of which is hereby incorporated by reference. This application is also related to U.S. patent application Ser. Nos. 10/971,955 and 10/971,963, both naming Toru Kohda as the sole inventor, filed on Oct. 22, 2004, the entire specifications of which are incorporated herein by reference for all purposes as if fully set forth herein.

BACKGROUND OF THE INVENTION

The present invention relates to a pipe coupling.

The present invention has two co-pending applications, one of which is U.S. patent application Ser. No. 10/971,955 filed on Oct. 22, 2004. FIGS. 1 and 2 show a pipe coupling comprising a coupling member according to the invention disclosed in the one of the co-pending applications.

As illustrated in FIGS. 1 and 2, the pipe coupling 10 comprises: female and male coupling members 12, 12' having, respectively, valve holders 26, 26' configured to be movable within through holes 14, 14' formed through the coupling members, in the axial directions of the through holes; and rotatable valve members 30, 30' defining substantially spherical shapes and supported by the valve holders to be rotated about pivotal axes A, A' extending normal to the axial directions of the through holes. When the coupling members 12, 12' are to be connected with each other, the valve holders 26, 26' are urged against each other to be moved rearward relative to the coupling members 12, 12', respectively. In association with this action, the rotatable valve members 30, 30' are rotated into their opening positions (FIG. 2) to allow a fluid to flow through the coupling members. When the coupling members are to be disconnected from each other, the valve holders 26, 26' are pushed back under a force exerted by compression springs 28, 28', and in association with this action, the rotatable valve members 30, 30' are rotated into their closing positions (FIG. 1) to block the fluid and prevent it from flowing through the through holes 14, 14' of the coupling members 12, 12'. As described above, in the pipe coupling 10, an opening/closing operation of the rotatable valve members 30, 30' is effected under axial movement of the valve holders 26, 26'. The valve holders 26, 26' are sealingly engaged with O-rings 24, 24' disposed on respective interior surfaces of the coupling members 12, 12' so that fluid is prevented from leaking to the outside of the pipe coupling through between the coupling members 12, 12' and the valve holders 26, 26'. In the pipe coupling 10, when the female and the male coupling members 12, 12' are disconnected from each other, respective valve holders 26, 26' are forced by the compression springs 28, 28' to advance forward, so that the rotatable valve members 30, 30' are rotated to their closing positions.

In the pipe coupling 10 of the co-pending application, it is desired that when the female coupling member is disconnected from the male coupling member 12', the valve holders 24, 24' can be smoothly returned under force of the compression spring 28, 28' without interference by the O-rings 24, 24' to enable the valve members 30, 30 to be positively brought to their closing positions.

SUMMARY OF THE INVENTION

To this end, the present invention provides a pipe coupling comprising: a first coupling member (corresponding to a female coupling member in an embodiment described below); and a second coupling member (corresponding to a male coupling member in the same embodiment) which are connected with each other, wherein the first coupling member comprises:

a first tubular body having an interior surface defining a first through hole having an axis, the first through hole having a forward end, a rearward end, a first small diameter portion and a first large diameter portion extending from the first small diameter portion towards the rearward end;

a sleeve mounted on the interior surface defining the first large diameter portion of the first through hole and having a portion extending through the small diameter portion towards the forward end; and a first valve comprising a first tubular forward end portion extending into the extending portion of the sleeve and having a first fluid passage extending therethrough, the first valve being disposed in the sleeve and movable in a direction of the axis between an opening position, wherein the first valve has been moved towards the rearward end of the first through hole so that the forward and rearward ends of the first through hole are fluidly communicated with each other, and a closing position wherein the first valve has been moved forwardly from the opening position so that the forward and rearward ends of the first through hole are fluidly disconnected from each other, and the second coupling member comprises:

a second tubular body having an interior surface defining a second through hole having an axis, the second through hole having a forward end, a rearward end, a second small diameter portion and a second large diameter portion extending from the second small diameter portion towards the rearward end; and a second valve comprising a second tubular forward end portion extending through the second small diameter portion and having a second fluid passage extending therethrough, the second valve being disposed in the second through hole and movable in a direction of the axis between an opening position, wherein the second valve has been moved towards the rearward end of the second through hole so that the forward and rearward ends of the second through hole are fluidly communicated with each other, and a closing position wherein the second valve has been moved forwardly from the opening position so that the forward and rearward opening ends are fluidly disconnected from each other, wherein when the first and second coupling members have been connected with each other, the extending portion of the sleeve of the first coupling member is inserted into the second small diameter portion of the second through hole of the second coupling member so that the first and second tubular forward end portions abut and urge against each other and the first and second valves are positioned at their respective opening positions to fluidly connect the first and second through holes; and the interior surface of the second small diameter portion of the second tubular body is provided with an annular seal which is sealingly and slidably engaged with an outer surface of the extending portion of the sleeve inserted into the second small diameter portion.

In this pipe coupling, once the first and the second coupling member are connected, leakage of fluid from the mutually abutting forward ends of the first and the second valves and through a clearance between each of the coupling members to the outside is prevented by the annular seal, which is sealingly engaged with the outer surface of the extending portion of the sleeve. Furthermore, since this annular seal does not come into contact with the first and the second valves, which may be displaced in their axial directions, the seal will not interfere with axial movement of the first and the second valves and therefore will not interfere with motion of the valves during a disconnecting operation of the coupling members. Consequently, as mentioned above, any danger of leakage of fluid resulting from incomplete motion of the valves is obviated.

In one embodiment of the pipe coupling according to the present invention, the sleeve may be made of sheet metal which is press-formed to provide a large diameter portion configured to tightly fit with the interior surface defining the first large diameter portion of the first through hole and the extending portion extending from the large diameter portion through the first small diameter portion of the first through hole, so as to tightly fit thereto.

In another embodiment of the pipe coupling of the present invention, preferably, in a state where the first and the second coupling members are not connected to one another, the second tubular forward end portion extending through the second small diameter portion of the second coupling member is not in contact with the annular seal.

In another embodiment of the pipe coupling of the present invention, the valve of at least one of the first coupling member and the second coupling member comprises:

a valve holder movable between the opening position and the closing position; and a rotatable valve member supported by the valve holder to be rotatable about a pivotal axis A extending normal to the axis of the through hole, the rotatable valve member being adapted to rotate between an opening rotational position to allow fluid to flow through the coupling member, when the valve holder is in the opening position, and a closing rotational position to prevent flow of the fluid through the coupling member when the valve holder is in the closing position; wherein a cam mechanism is operatively provided between the valve and the tubular body of at least one of the coupling members such that the rotatable valve member rotates between the closing rotational position and the opening rotational position as the valve holder moves between the closing position and the opening position, the cam mechanism comprising a cam member disposed in a predetermined position in the tubular body, and a cam profile portion provided on the rotatable valve member and slidably engaged with the cam member such that, when the valve holder is moved between the closing position and the opening position, the rotatable valve member is rotated between the closing rotational position and the opening rotational position;

the valve holder comprises a stopper to which the rotatable valve member abuts and thus stops at the opening rotational position when the rotatable valve member has been moved to the opening rotational position; and the tubular body includes a spring member for the valve member for urging the rotatable valve member against the stopper.

In still another embodiment of the pipe coupling of the present invention, the valve holder comprises a forward tubular portion including the tubular forward end portion, and a rearward tubular portion as defined along the axis of the tubular body from the forward end towards the rearward end, and also an intermediate portion interconnecting the forward and the rearward tubular portions;

the rotatable valve member is supported to be rotatable in the intermediate portion and includes an outer surface defining a spherical shape and a truncated surface portion formed to be normal to a through hole of the rotatable valve member;

a stopper is formed in a forward end peripheral edge of the rearward tubular portion protruding forward from the forward-end peripheral edge; and when the rotatable valve member is rotated from the closing rotational position into the opening rotational position, the truncated surface portion is engaged with and stopped by the stopper, and a valve urging spring member attached to the tubular body biases the rotatable valve member to urge the truncated surface portion against the stopper.

DESCRIPTION OF THE PREFERRED EMBODIMENTS

A pipe coupling according to the present invention will now be described with reference to the attached drawings.

Figure 1:
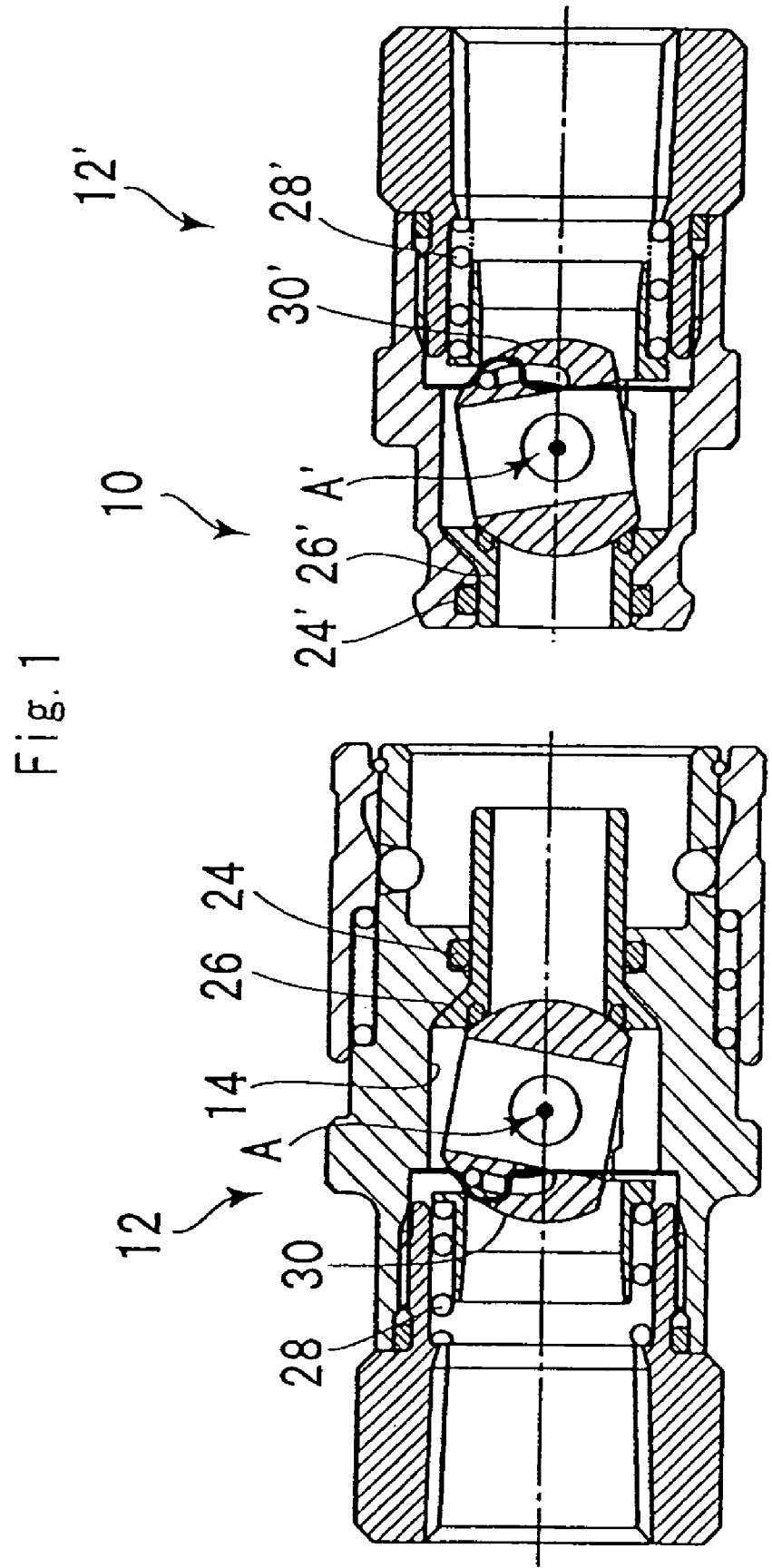
FIG. 1 is a longitudinal sectional view of a pipe coupling representing the base of the present invention, and showing a state where a male coupling member and a female coupling member are separated from each other.
Figure 2:
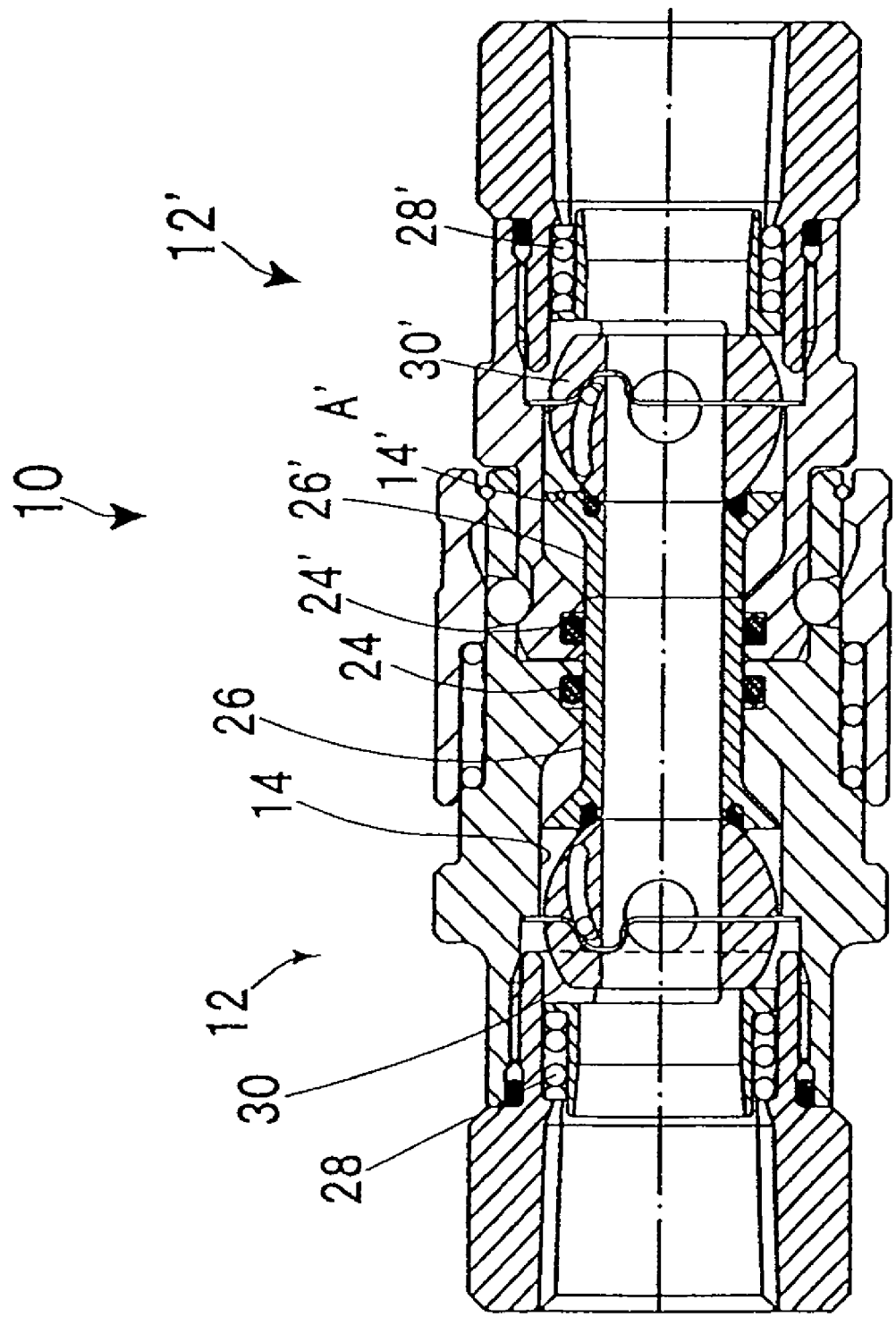
FIG. 2 is another longitudinal sectional view of the same pipe coupling, showing a state where the male coupling member and the female coupling member are connected with each other.
Figure 3:
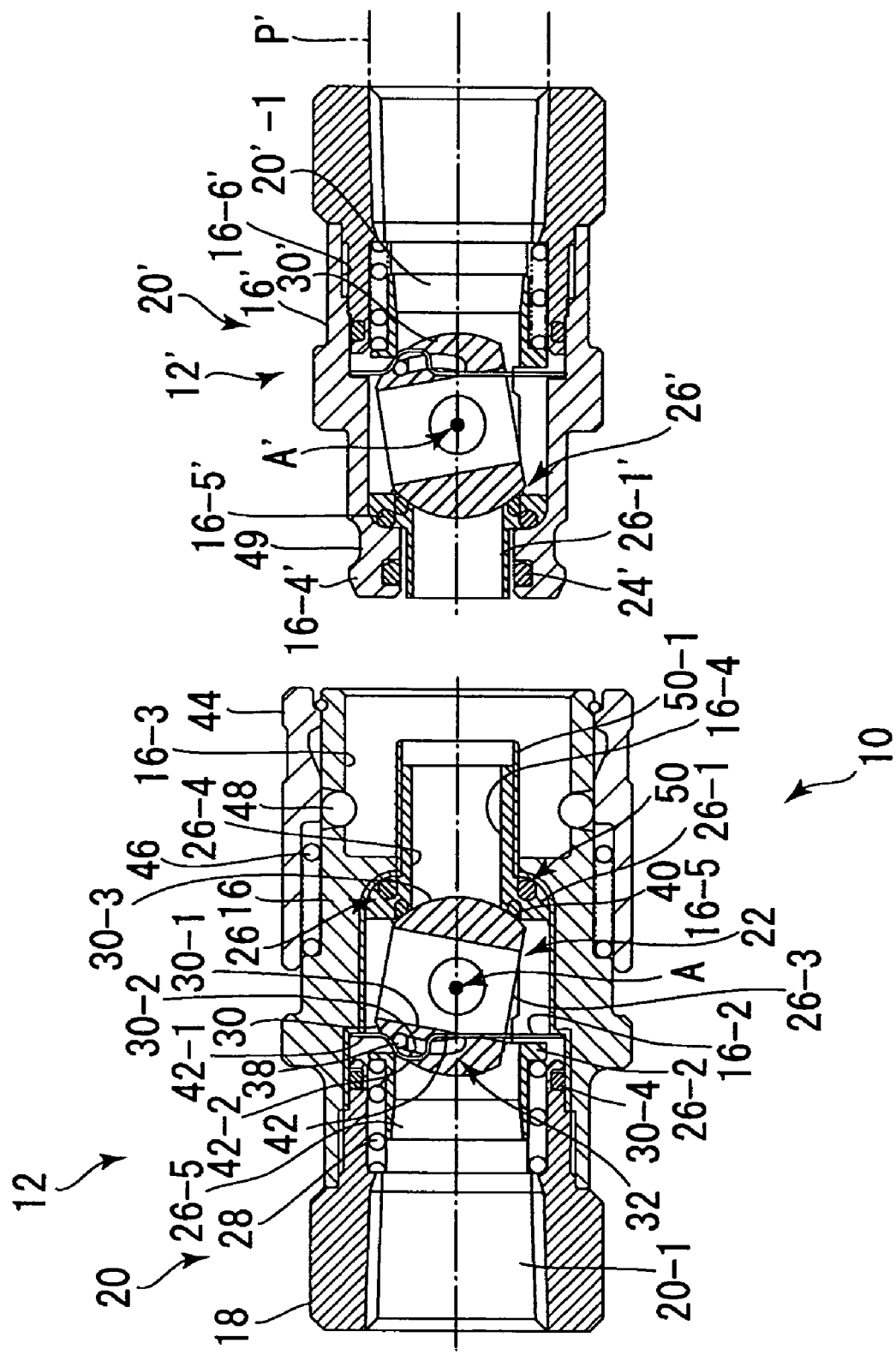
FIG. 3 is a longitudinal sectional view of a pipe coupling according to the present invention, showing a state where a male coupling member and a female coupling member are separated from each other.
Figure 4:
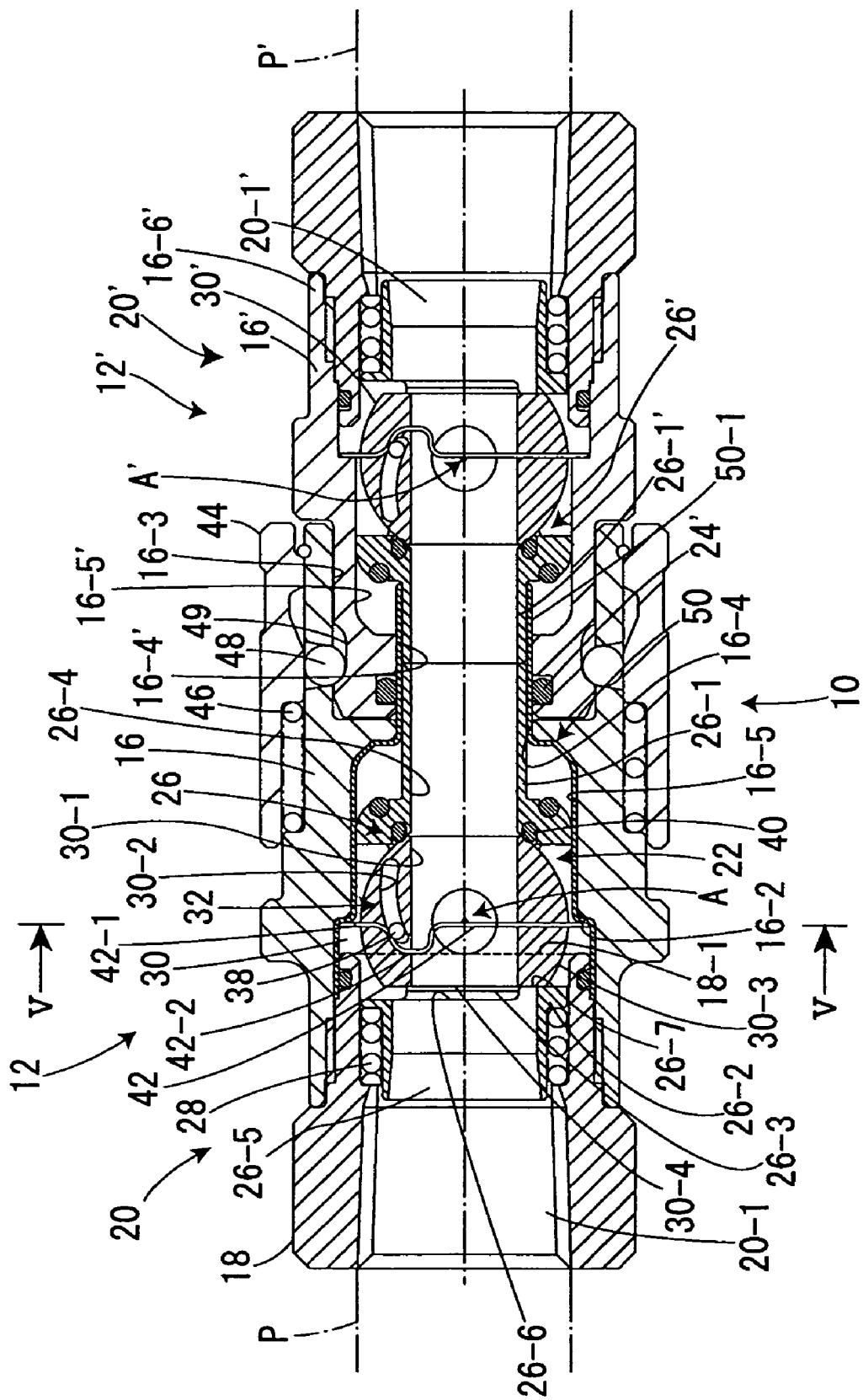
FIG. 4 is a longitudinal sectional view of a pipe coupling according to the present invention, showing a state where a male coupling member and a female coupling member are connected with each other.
Figure 5:
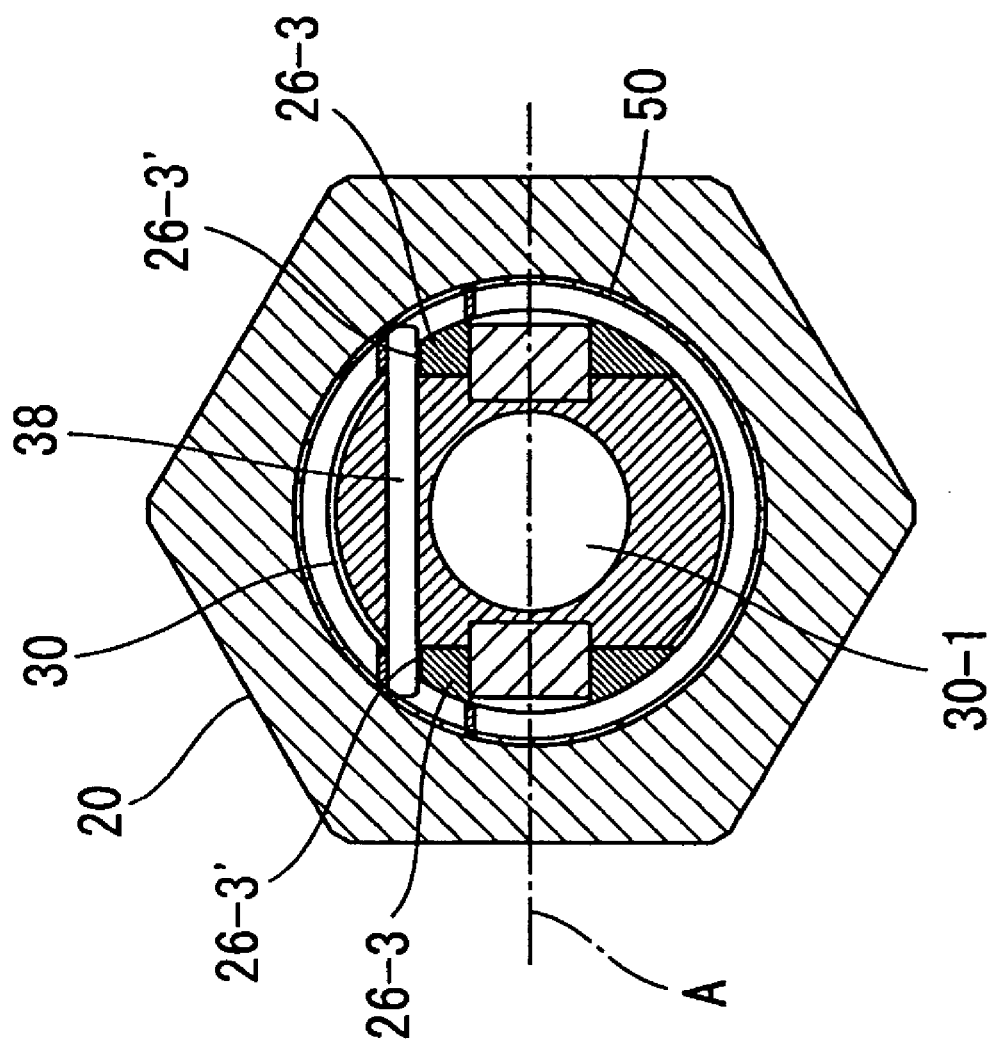
FIG. 5 is a sectional view taken along the line V—V of FIG. 4.

FIGS. 3 and 4 show a pipe coupling 10 comprising a female coupling member 12 and a male coupling member 12' according to the present invention, and FIG. 5 shows an arrangement of a pin 38 serving as a cam member for opening and closing a valve in the same pipe coupling.

As illustrated, the female coupling member 12 comprises a tubular body 20 comprising a tubular coupling member body 16 and a tubular adapter 18 connected to a rearward end of the coupling member body, and serving to connect the coupling member 10 with a conduit P, and a valve 22 disposed in a through hole 20-1 extending through the tubular body to be movable in a direction of an axis of the through hole.

The valve 22 comprises a valve holder 26 movable in the axial direction of the through hole, a spring member 28 for urging the valve holder towards the forward end of the tubular body 20, and a rotatable valve member 30 supported by the valve holder 26 to be rotatable about a pivotal axis A extending in a direction normal to the axis of the tubular body 20.

The valve holder 26 comprises a forward tubular portion 26-1, a rearward tubular portion 26-2 and a rotatable valve support portion comprising a pair of left and right side walls 26-3, 26-3 (only one of them is illustrated in FIGS. 3 and 4) extending between the forward and the rearward tubular portions for interconnecting them, in which the rotatable valve member 30 is supported by the left and the right side walls 26-3, 26-3 to be rotatable about the pivotal axis A. The rotatable valve member 30 has a through hole 30-1 extending in a direction normal to the pivotal axis.

A cam mechanism 32 is operatively provided between the valve 22 and the tubular body 20 such that the rotatable valve member 30 is able to rotate about the pivotal axis A as the valve holder 26 moves along the axial direction of the through hole. Specifically, the cam mechanism 32 comprises a cam hole 30-2, which is formed to pass through the rotatable valve member 30 in a direction parallel to the pivotal axis and to follow a desired cam curve in its cross-sectional surface extending normal to the pivotal axis, and a straight pin 38 extending through the cam hole 30-2 in the direction of the pivotal axis. As illustrated in FIG. 5, opposite ends of the pin 38 are loosely fitted in spaces enclosed by upper horizontal surfaces 26-3', 26-3' of the left and the right side walls 26-3, 26-3, respectively, a valve urging spring 42 (which will be described later), and an annular shoulder portion 16-2 of the coupling member body 16 facing rearward which will be also described later. When the valve holder 26 is moved in the axial direction of the through hole, the rotatable valve member 30, which is configured to move in the axial direction in association with the valve holder 26, is rotated about the pivotal axis A, with the side wall of the cam hole 30-2 formed therein sliding on the pin 38. That is, the pin 38 is configured to be loosely fitted at opposite ends thereof in the above-mentioned spaces, brought into contact with the wall surface of the cam hole 30-2, displaced appropriately, and further engaged with the valve member urging spring 42 or the like defining the spaces to thereby provide the rotatable valve member 30 with a rotational moment about the pivotal axis via the wall surface of the cam hole 30-2. Since the pin 38 is not fixedly attached but is allowed to be appropriately displaced, no excessive force is induced between the pin 38 and the side wall of the cam hole 30-2, and accordingly the rotatable valve member 30 is able to rotate smoothly.

In a state as illustrated in FIG. 3 where the female coupling member 12 and the male coupling member 12' have been disconnected and thus separated from each other, the valve 22 has been urged by the spring member 28 towards the forward end of the tubular body 20 to be placed in a closing position. In this closing position, the rotatable valve member 30 is also in a closing rotational position, wherein a through hole 30-1 of the rotatable valve member 30 is not aligned with through holes 26-4 and 26-5 of the forward and the rearward tubular portions 26-1 and 26-2 of the valve holder 26 and an outer surface 30-3 defining a spherical surface of the rotatable valve member 30 is sealingly engaged with an O-ring 40 disposed circumferentially around a rearward opening of the forward tubular portion 26-1 so as to block the flow of fluid through the valve 22.

In a state as illustrated in FIG. 4 where the female coupling member 12 and the male coupling member 12' have been interconnected, the valve 22 has been placed in an opening position defining a state where the valve 22 has been rearwards or leftwards relative to the female coupling member into the tubular body 20 against the force from the spring member 28, and in this opening position, the rotatable valve member 30 is in an opening rotational position, wherein the through hole 30-1 of the rotatable valve member 30 is aligned with the through holes 26-4 and 26-5 of the forward and the rearward tubular portions 26-1 and 26-2 of the valve holder 26 so as to allow the fluid to flow through the valve 22.

As the valve 22 is moved from the closing position as shown in FIG. 3 into the opening position as shown in FIG. 4, the cam hole 30-2 slidably engages with the pin 38, so that the rotatable valve member 30 is subject to the rotational moment in a clockwise direction under a reaction force exerted from the pin, and is forced to rotate from the closing rotational position to the opening rotational position. Inversely, as the valve 22 is moved from the opening position as shown in FIG. 4 into the closing position as shown in FIG. 3, the cam hole 30-2 is slidably engaged with the pin 38, so that the rotatable valve member 30 is subject to the rotational moment in a counterclockwise direction under the reaction force exerted from the pin, and is thus forced to rotate from the opening rotational position to the closing rotational position.

A part (lower portion in the drawing) of a forward end surface 26-6 of the rearward tubular portion 26-2 of the valve holder 26 extends forward and forms a stopper 26-7 for the rotatable valve member 30; while on the other hand, the rotatable valve member 30 has a truncated surface portion 30-4 formed to be normal to the through hole 30-1, in which the truncated surface portion 30-4 is brought, in the opening rotational position (FIG. 4) of the rotatable valve member, into face-to-face engagement with the stopper 26-7 to be held stationary in the same location. In addition, an interior surface of the through hole of the coupling member body 16, which is configured to surround the periphery of the rotatable valve member 30 in its opening rotational position, is provided with an annular shoulder portion 16-2 facing towards the rearward end of the coupling member body 16; and the valve urging spring member 42 having an annular shape to surround the periphery of the rotatable valve member 30 is disposed between the shoulder portion 16-2 and a forward end peripheral edge 18-1 of an adapter 18 so as to be engaged with the pin 38. Specifically, the valve urging spring member 42 is formed from a thin flexible sheet strip to comprise an annular shoulder abutting portion 42-1 which is brought into abutment against the shoulder portion 16-2, and an adapter abutting portion 42-2 which is bent from the annular portion 42-1 towards the rearward end of the female coupling member 12 so as to come into abutment against the forward end peripheral edge surface 18-1 of the adapter 18, and is held and clamped between the shoulder portion 16-2 and the forward end peripheral edge surface 18-1 of the adapter 18. The adapter abutting portion 42-2 is arranged at each of two locations spaced circumferentially along the annular shoulder abutting portion 42-1 (only one of them is shown in the drawing), and the adapter abutting portions 42-2 rising from the annular shoulder abutting portion 42-1 towards the rearward end of the female coupling member 12, together with the shoulder portion 16-2 and the upper horizontal surfaces 26-3' and 26-3' formed in the left and the right side walls 26-3 and 26-3 define the spaces for holding the opposite ends of the pin 38. During rotation of the rotatable valve member 30 towards the opening rotational position, starting effectively before the truncated surface portion 30-4 of the rotatable valve member 30 is urged against the stopper 26-7, the pin 38 is urged by the side wall of the cam hole 30-2 against the valve member urging spring 42 under a gradually increasing force. In a state where the truncated surface portion 30-4 of the rotatable valve member 30 has been urged against the stopper 26-7, the rotatable valve member 30 is stably held so as not to depart from the stopper even if a significant variation in fluid pressure occurs. Thereby, the through hole of the rotatable valve member 30 can be held open.

The male coupling member 12' basically has a similar configuration to that of the female coupling member 12; and main components of the male coupling member 12', equivalent to those in the female coupling member 12, are designated by the same reference numerals denoted with the addition of <'> in FIGS. 3 and 4.

To connect the male coupling member 12' with the female coupling member 12 which have each been placed in the state shown in FIG. 3, an operating sleeve 44 disposed over the outer periphery of the female coupling member 12 is retracted against a force exerted from a spring member 46 to thereby prepare a condition for allowing a locking ball 48 to be displaced outward in a radial direction. The forward end portion of the male coupling member 12' is then inserted into the forward end portion of the female coupling member 12 so as to provide a connection. During this operation, the valves 22, 22' of the female and the male coupling members are brought into abutment against each other at their forward end surfaces and are retracted against forces exerted from the spring members 28, 28', respectively.

Accordingly, as described above, the rotatable valve members 30, 30' are moved from the closing rotational positions to the opening rotational positions, respectively, and at the same time the operating sleeve 44 is returned to its original position so that the locking ball 48 at rest within a locking recessed portion 49 formed on an outer surface of the tubular body 20' of the male coupling member 12' is pressed from outside in a radial direction so as to be held in a stationary state. To disconnect the female coupling member from the male coupling member, the operating sleeve 44 is retracted against the force exerted by the spring member 46; and the male coupling member is then pulled out of the female coupling member.

The configuration that has been described above represents a basic configuration of the pipe coupling 10 according to the present invention and is substantially the same as that disclosed in the above-mentioned Patent Application titled as "A coupling member of a pipe coupling" filed on the same date as the present application.

The pipe coupling 10 according to the present invention additionally has the following features.

That is, the through hole of the coupling member body 16 constituting the tubular body 20 of the female coupling member 12 defines, from the forward end towards the rearward end thereof, a male coupling member receiving portion 16-3, a small diameter portion 16-4 following the coupling member receiving portion, a valve receiving portion 16-5 extending rearward from the small diameter portion, and an adapter receiving portion 16-6, in which along an interior surface of the valve receiving portion 16-5 there is provided a sleeve 50 having an extending portion 50-1 extending through the smaller diameter portion 16-4 into the male coupling member receiving portion 16-3.

The valve 22, when placed in the closing position (FIG. 3), defines a state where the forward tubular portion 26-1 of the valve 22 extends through the extending portion 50-1 of the sleeve 50 until the forward end thereof is substantially aligned with the forward end of the tubular body 20.

The through hole of a coupling member body 16' constituting a tubular body 20' in the male coupling member 12' defines, from the forward end towards the rearward end along the axial direction, a small diameter portion 16-4', a valve receiving portion 16-5' and an adapter receiving portion 16-6'; and a forward tubular portion 26-1' of a valve holder 26' is configured to define a diameter that is substantially the same size as that of the small diameter portion 16-4' of the through hole of the tubular body.

When the female coupling member 12 and the male coupling member 12' are to be connected to each other, the sleeve 50 is inserted into and advanced through the smaller diameter portion 16-4' in the forward end of the through hole of the coupling member body 16' of the male coupling member 12', and the valves 22, 22' of the female and the male coupling members 12, 12' come into abutment against each other within the extending portion 50-1 of the sleeve 50 to be brought into the opening positions (FIG. 4), respectively, where the fluid is allowed to flow through the female and the male coupling members.

The small diameter portion 16-4' of the through hole of the coupling member body 16' of the male coupling member 12' is provided with an O-ring 24' which is slidably and sealingly engaged with the outer surface of the extending portion 50-1 of the sleeve 50 which has been inserted into the smaller diameter portion 16-4.

In this pipe coupling, once the female coupling member 12 and the male coupling member 12' are connected, leakage of fluid from the valves 22 and 22' through a clearance between the female coupling member 12 and the male coupling members 12' to the outside can be blocked by the O-ring 24' which is sealingly engaged with the outer surface of the extending portion 50-1 of the sleeve 50. However, since the O-ring 24' is not in contact with the valve 22, 22' of the female and the male coupling members 12, 12' which are displaceable in their axial directions, the valves 22, 22' can smoothly move in their axial directions without any interference by the O-ring 24'.

It should be noted that the present invention is not necessarily limited to the foregoing embodiment but can be modified in a variety of ways without departing from the gist of the present invention.

What is claimed is:

1. A pipe coupling comprising first and second coupling members which are connected with each other; wherein
said first coupling member comprises:
a first tubular body having an interior surface defining a first through hole having an axis, said first through hole having a forward end, a rearward end, a first small diameter portion and a first large diameter portion extending from said first small diameter portion towards said rearward end;
a sleeve mounted on said interior surface defining said first large diameter portion of said first through hole and having an extending portion extending through said small diameter portion towards said forward end; and
a first valve comprising a first tubular forward end portion extending into said extending portion of said sleeve and having a first fluid passage extending therethrough, said first valve being disposed in said sleeve and movable in a direction of said axis between an opening position wherein said first valve has been moved towards said rearward end of said first through hole so that said forward and rearward ends of said first through hole are fluidly communicated with each other and a closing position wherein said first valve has been moved forward from said opening position so that said forward and rearward ends of said first through hole are fluidly disconnected from each other, and
said second coupling member comprises:
a second tubular body having an interior surface defining a second through hole having an axis, said second through hole having a forward end, a rearward end, a second small diameter portion and a second large diameter portion extending from said second small diameter portion towards said rearward end; and
a second valve comprising a second tubular forward end portion extending through said second small diameter portion, and having a second fluid passage extending therethrough, said second valve being disposed in said second through hole and movable in a direction of said axis between an opening position wherein said second valve has been moved towards said rearward end of said second through hole so that said forward and rearward ends of said second through hole are fluidly communicated with each other and a closing position wherein said second valve has been moved forward from said opening position so that said forward and rearward opening ends are fluidly disconnected from each other, wherein when said first and second coupling members have been connected with each other, said extending portion of said sleeve of said first coupling member is inserted into said second small diameter portion of said second through hole of said second coupling member so that said first and second tubular forward end portions abut and urge against each other, and said first and second valves are positioned at their respective opening positions to fluidly connect said first and second through holes; and said interior surface of said second small diameter portion of said second tubular body is provided with an annular seal which is sealingly and slidably engaged with an outer surface of said extending portion of said sleeve inserted into said second small diameter portion.

2. A pipe coupling as set forth in claim 1 wherein said sleeve is made of sheet metal by press-forming to comprise:
   a large diameter portion configured to tightly fit to said interior surface defining said first large diameter portion of said first through hole; and
   said extending portion extending from said large diameter portion through said first small diameter portion of said first through hole so as to tightly fit thereto.

3. A pipe coupling as set forth in claim 2 wherein in a state where said first and said second coupling members are not connected to each other, said second tubular forward end portion extending through said second small diameter portion of said second coupling member is not in contact with said annular seal.

4. A pipe coupling as set forth in claim 3 wherein said valve of at least one of said first coupling member and said second coupling member comprises:
   a valve holder movable between said opening position and said closing position; and
   a rotatable valve member supported by said valve holder to be rotatable about a pivotal axis A extending normal to said axis of said through hole said rotatable valve member adapted to rotate between an opening rotational position to allow the fluid to flow through the coupling member when said valve holder is in said opening position and a closing rotational position to block the fluid so as not to flow through said coupling member when the valve holder is in said closing position; wherein, a cam mechanism is operatively provided between said valve and said tubular body of at least one of said coupling members such that said rotatable valve member rotates between said closing rotational position and said opening rotational position as said valve holder moves between said closing position and said opening position;

said cam mechanism comprises a cam member disposed in a predetermined position in said tubular body and a cam profile portion provided on said rotatable valve member and slidably engaged with said cam member such that, when said valve holder is moved between said closing position and said opening position, said rotatable valve member is rotated between said closing rotational position and said opening rotational position;

said valve holder comprises a stopper to which said rotatable valve member abuts and thus stops at said opening rotational position when said rotatable valve member has been moved to said opening rotational position; and said tubular body includes a valve urging spring member for the valve member for urging said rotatable valve member against said stopper.

5. A pipe coupling as set forth in claim 4 wherein:
said valve holder comprises a forward tubular portion including said tubular forward end portion, and a rearward tubular portion as defined along said axis of said tubular body from the forward end towards the rearward end, and an intermediate portion interconnecting said forward and said rearward tubular portions;

said rotatable valve member is supported to be rotatable in said intermediate portion and includes an outer surface defining a spherical shape and a truncated surface portion formed to be normal to a through hole of said rotatable valve member;

said stopper is formed on a forward end peripheral edge of said rearward tubular portion protruding forward therefrom so that, when said rotatable valve member is rotated from said closing rotational position into said opening rotational position, said truncated surface portion is engaged with and stopped by said stopper, and said valve urging spring member biases said rotatable valve member to urge said truncated surface portion against said stopper.

* * * * *